(12) United States Patent
Neet

(10) Patent No.: US 6,873,082 B2
(45) Date of Patent: Mar. 29, 2005

(54) STATOR ASSEMBLY INCLUDING A CORE SLOT INSERT MEMBER

(75) Inventor: Kirk E. Neet, Saline, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/414,732

(22) Filed: Apr. 15, 2003

(65) Prior Publication Data

US 2004/0207284 A1 Oct. 21, 2004

(51) Int. Cl.$^7$ ................................................ H02K 3/34
(52) U.S. Cl. ...................................... 310/215; 310/216
(58) Field of Search ................................ 310/214, 215, 310/216; 29/596–598

(56) References Cited

U.S. PATENT DOCUMENTS

| | | | | |
|---|---|---|---|---|
| 4,302,692 A | * | 11/1981 | Matsumoto et al. | 310/113 |
| 5,300,844 A | * | 4/1994 | Schuler | 310/215 |
| 5,763,978 A | * | 6/1998 | Uchida et al. | 310/215 |
| 6,291,918 B1 | * | 9/2001 | Umeda et al. | 310/215 |
| 6,459,186 B1 | * | 10/2002 | Umeda et al. | 310/208 |

FOREIGN PATENT DOCUMENTS

| | | |
|---|---|---|
| FR | 2536917 | 6/1984 |
| GB | 122 689 | 1/1919 |
| JP | 09 23 3739 | 9/1997 |
| SU | 108 0235 | 3/1984 |

* cited by examiner

*Primary Examiner*—Tran Nguyen
(74) *Attorney, Agent, or Firm*—MacMillan, Sobanski & Todd LLC

(57) ABSTRACT

A stator assembly for a dynamoelectric machine in accordance with the present invention includes a stator core having a plurality of core slots in a surface thereof. Each of the core slots define a plurality of tooth members therebetween. A plurality of insert members is each fixedly received by a respective one of the core slots for lining each respective core slot. The insert members have a pair of leg members extending from a base member that form an aperture therebetween. A stator winding includes straight wire segments that are received by the insert members. The straight segments of the stator winding and the insert members are electrically insulated from one another. At least one of the extending leg members is bent over a portion of the straight wire segments in the core slots, narrowing the aperture between the extending leg members.

14 Claims, 4 Drawing Sheets

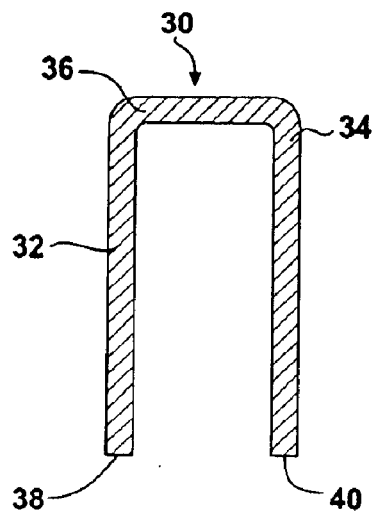
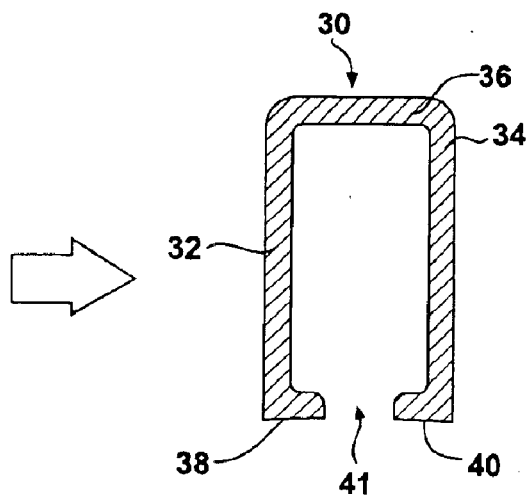
FIG - 2A  FIG - 2B
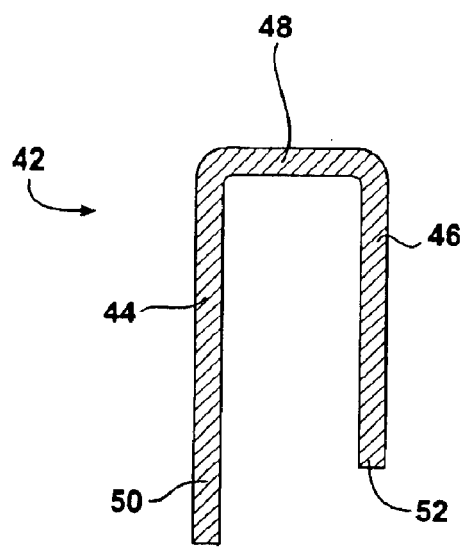
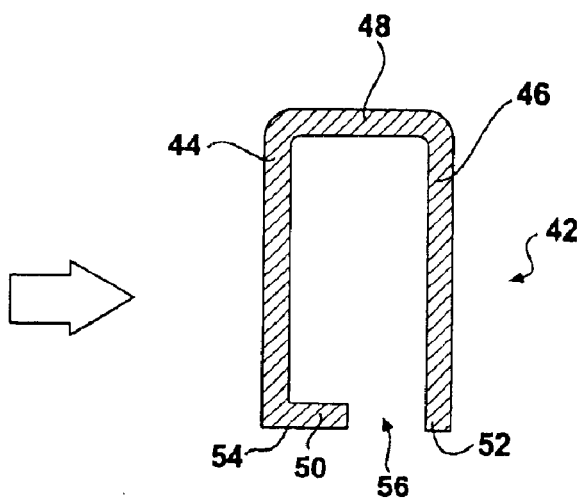
FIG - 3A  FIG - 3B

STATOR ASSEMBLY INCLUDING A CORE SLOT INSERT MEMBER

BACKGROUND OF THE INVENTION

The present invention relates generally to stators for dynamoelectric machines and, in particular, to an stator assembly for a dynamoelectric machine including a core slot insert member.

Dynamoelectric machines, such as alternating current electric generators, or alternators, are well known. Prior art alternators typically include a stator assembly and a rotor assembly disposed in an alternator housing. The stator assembly is mounted to the housing and includes a generally cylindrically-shaped stator core having a plurality of axially-extending core slots formed therein. The core slots define a plurality of teeth therebetween. The teeth are connected to the core by a yoke portion. The rotor assembly includes a motor rotor attached to a generally cylindrical shaft that is rotatably mounted in the housing and is coaxial with the stator assembly. The stator assembly includes a plurality of wires wound thereon, forming windings. The stator windings are formed of straight portions that are located in the slots and end loop sections that connect two adjacent straight portions and are formed in a predetermined multi-phase (e.g. three or six) winding pattern in the slots of the stator core. The rotor assembly typically includes opposed poles as part of claw fingers having magnets that are positioned around an electrically charged rotor coil. The rotor coil produces a magnetic field. When a prime mover, such as a steam turbine, a gas turbine, or a drive belt from an automotive internal combustion engine, rotates the rotor assembly, the magnetic field of the rotor assembly passes through the stator windings, inducing an alternating electrical current in the stator windings, such as by magnetic flux from the rotor poles flowing from a pole of the rotor to the core teeth, through the core yoke and back to another opposite pole of the rotor. The alternating electrical current is then routed from the alternator to a distribution system for consumption by electrical devices or, in the case of an automotive alternator, to a rectifier and then to a charging system for an automobile battery. Although the "claw pole" rotor is described, those skilled in the art will recognize that the described stator design can be used in conjunction with other types of rotors, such as; permanent magnet non claw pole, permanent magnet claw pole, salient field wound and induction type rotors. It is known in the art that in order to increase the output and efficiency of an alternator it is desirable to have stator winding conductors of rectangular shaped cross sections that are aligned in a radial row in each core slot and whose widths, including any insulation, closely fit to the width, including any insulation, of the core slots. This is advantageous because the larger conductor width reduces the electrical resistance of the stator winding. It is also known in the art to provide a stator core with small slot openings at the inner diameter of the core, which results in more steel area on the inner diameter of the stator. The increased steel area increases the effective air gap area, which in turn increases alternator output. A smaller air gap also reduces the fluctuation of magnetic flux on the rotor pole surface which reduces eddy current losses and therefore increases alternator efficiencies. It is also desirable, however, to ease manufacturing of the stator winding by having continuous rectangular shaped conductors that are radially inserted through the core slot openings. These desirable features, however, lead to a design contradiction because the conductors that fit closely to the width of the core slot cannot be inserted into the core slot from a radially inward position through a smaller core opening.

Some prior art stator assemblies utilize continuous conductors that are small enough to enter the slot openings but disadvantageously do not closely fit the width of the slot. This design solution results in an alternator with low output and efficiency. Other prior art stator assemblies utilize a wing portion that extends radially from each of the teeth which is then bent circumferentially to narrow the gap between the teeth. The wing portions, however, disadvantageously tend to tear because they are attached to the core teeth and are difficult to control to the required inner diameter which is critical for alternator performance. Other prior art stator assemblies utilize hairpin conductors, in which U-shaped conductors are placed in the core slots from an upper or lower axial end of the stator core and not from a radially inward position. While these U-shaped conductors are advantageously rectangular and fit closely to the width of the core slots, the difficulty of manufacturing the stator winding is still increased because each of the opposing ends of the U-shaped conductors must be welded to form the stator winding.

It remains desirable to provide a stator assembly for an dynamoelectric machine that has high output and high efficiency while also being easy to assemble and manufacture. It is also desirable to provide an insert member for the core slots of an dynamoelectric machine stator to allow for a stator winding having conductors that fit closely to the width of the core slots and that allows the conductors to be inserted into the core slots from a radially inward position while also providing a smaller core opening.

SUMMARY OF THE INVENTION

A stator assembly for a dynamoelectric machine in accordance with the present invention includes a generally cylindrically-shaped stator having a plurality of circumferentially spaced axially-extending core slots in a surface thereof. Each of the core slots have a respective radial depth and define a plurality of tooth members therebetween. The core slots extend between a first and a second end of the stator core. A plurality of insert members is each fixedly received by a respective one of the core slots for lining each respective core slot. The insert members have a pair of leg members extending from a base member that form an aperture therebetween. The insert members are formed from a magnetically permeable material. A stator winding includes substantially straight wire segments that are received by the insert members formed in at least one row of conductors. The straight segments of the stator winding and the insert members are electrically insulated from one another. At least one of the extending leg members is bent towards the other leg member over a portion of the straight wire segments in the core slots, narrowing the aperture between the extending leg members. Preferably, when at least one of the extending leg members is bent toward the other leg member, the aperture is narrowed to a distance that is smaller than the width of the straight segments of the stator winding.

A method for manufacturing the stator winding according to the present invention can be practiced by providing the conductors for the stator winding; providing the stator core; inserting the insert members into each core slot; inserting the stator winding into the insert members; and bending at least one of the extending leg members over a portion of the straight wire segments in the core slots and narrowing the aperture between the extending leg portions of the insert members.

The present invention advantageously solves the design contradictions noted above and results in an stator assembly for a dynamoelectric machine that allows for a stator winding having conductors that fit closely to the width of the core slots and that allows the conductors to be inserted into the core slots from a radially inward position while also providing a core opening which is smaller than the circumferential width of the conductors.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIGS. 2a and 2b are plan views of the an insert member in accordance with the present invention;

FIGS. 3a and 3b are plan views of an alternative embodiment of an insert member in accordance with the present invention;

DESCRIPTION OF THE PREFERRED EMBODIMENT

Figure 1:
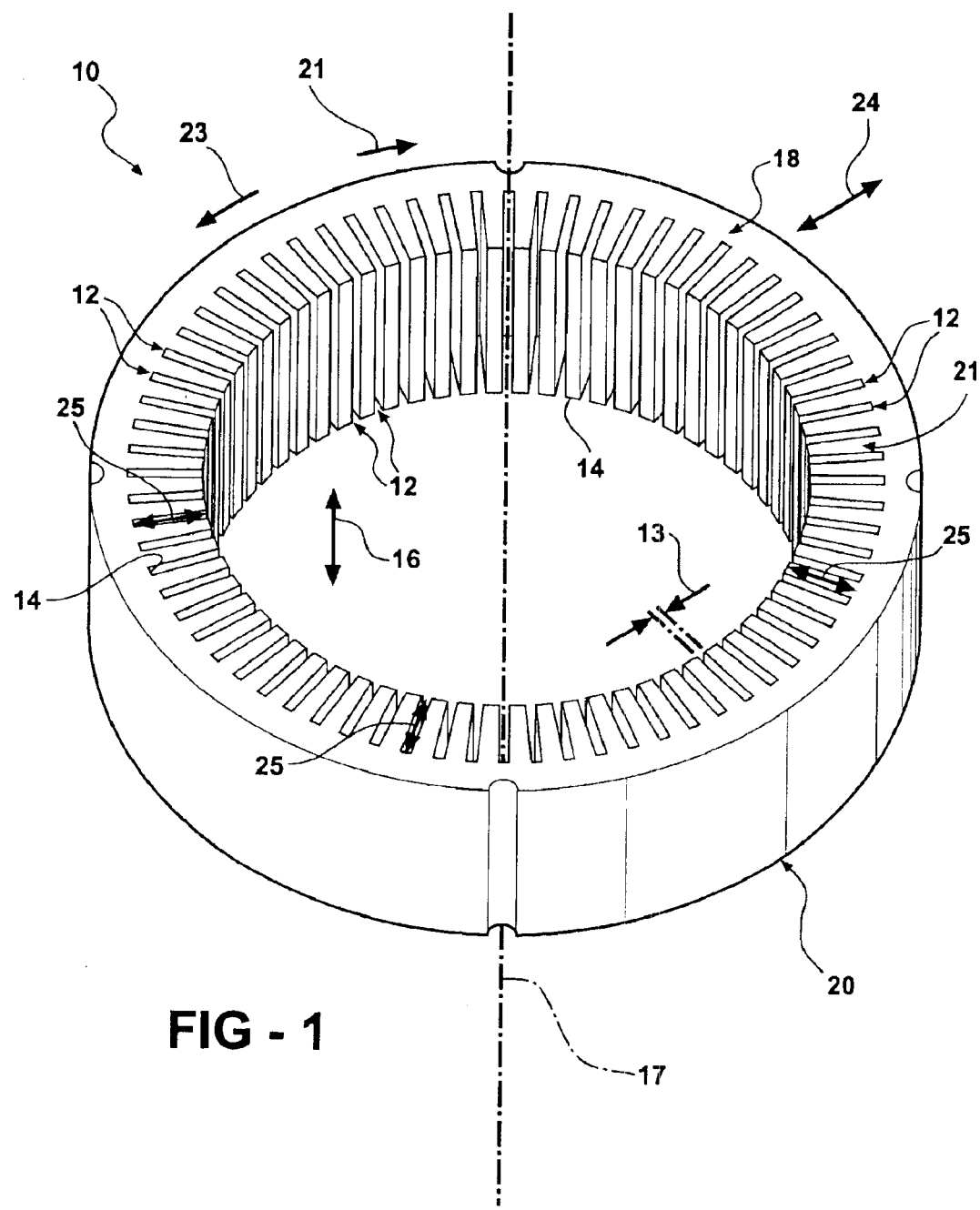
FIG. 1 is a perspective view of a stator core in accordance with the present invention.

Referring now to FIG. 1, a generally cylindrically-shaped stator core for an dynamoelectric machine (not shown), such as an alternating current generator or alternator, is indicated generally at 10. The stator core 10 is preferably constructed of steel, an iron alloy, or similar magneticallly permeable material and includes a plurality of core slots 12 formed in a circumferential interior surface 14 thereof. The core slots 12 are generally rectangular in cross section and extend in a direction, indicated by an arrow 16, parallel to a central axis 17 of the stator core 10 between a first end 18 and a second end 20 thereof. Alternatively, the core slots 12 could be other shapes other than rectangular, including, but not limited to, a generally square in cross section. The core slots 12 have a generally rectangular volume and define a plurality of teeth 19 therebetween. The teeth 19 are connected to the stator core 10 at a yoke portion 21 thereof. An axially upward direction is defined as moving toward the first end 18 of the stator core 10 and an axially downward direction is defined as moving toward the second end 20 of the stator core 10. Preferably, the core slots 12 are equally spaced around the circumferential interior surface 14 of the stator core 10. A circumferential clockwise direction is indicated by an arrow 21 and a circumferential counterclockwise direction is indicated by an arrow 23. The core slots 12 define a depth 25 along a radial axis, indicated by an arrow 24, and are adapted to receive a stator winding, discussed in more detail below. A radial inward direction is defined as moving towards the central axis 17 of the stator core 10 and a radial outward direction is defined as moving away from the central axis 17. Alternatively, the core slots 12 are formed in an exterior surface of the stator core 10.

Referring now to FIGS. 2a and 2b, an insert member in accordance with the present invention is indicated generally at 30. The insert member 30 is preferably constructed of steel, an iron alloy, or similar magnetically permeable material and includes a first extending leg portion or extension member 32 and a second extending leg portion or extension member 34 connected at respective ends thereof by a base member 36 to form the generally U-shaped insert member 30. The first extension member 32 includes a free end 38 and the second extension member 34 includes a free end 40. An outer edge of each of the free ends 38 and 40 is at a substantially equal distance from the base member 36, best seen in FIG. 2a.

The insert member 30 is adapted to be fixedly received by one of the core slots 12 of the stator core 10 with the free ends 38 and 40 facing radially inwardly. Preferably, the extension members 32 and 34 of the insert member 30 are attached to the core slot 12 by an interference fit.

Referring now to FIG. 2b, the free end 38 of the first extension member 32 and the free end 40 of the second extension member 34 are shown in an installed position. The free end 38 is bent towards the second extension member 34 and the free end 40 is bent towards the first extension member 32 such that the free ends 38 and 40 are substantially parallel to each other and subsantially perpendicular to the extension members 32 and 34. The free ends 38 and 40, when in the installed position, form a gap 41 therebetween.

Referring now to FIGS. 3a and 3b, an alternative embodiment of an insert member in accordance with the present invention is indicated generally at 42. The insert member 42 includes a first extension member 44 and a second extension member 46 connected at respective ends thereof by a base member 48 to form the generally U-shaped insert member 42. The first extension member 44 includes a free end 50 and the-second extension member 46 includes a free end 52. The length of the first extension member 44 is greater than the length of the second extension member 46 and, therefore, the free end 50 extends a predetermined distance from the base member 36 beyond the free end 52, best seen in FIG. 3a.

The insert member 42 is adapted to be fixedly received by one of the core slots 12 of the stator core 10 with the free ends 50 and 52 facing radially inwardly. Preferably, the extension members 44 and 46 of the insert member 42 are attached to the core slot 12 by an interference fit, which provides a stable insertion point for the conductors of a stator winding, discussed in more detail below.

Referring now to FIG. 3b, the free end 50 of the first extension member 50 is shown in an installed position. The free end 50 is bent towards the second extension member 46 such that an outer edge 54 of the free end 50 and the free end 52 are at a substantially equal distance from the base member 48. The free ends 50 and 52, when in the installed position, form a gap 56 therebetween.

Figure 4A:
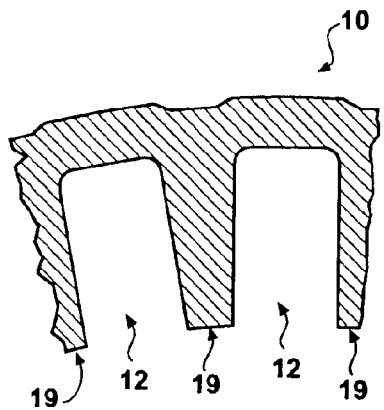
FIGS. 4a–4d are fragmentary plan views of the insert member shown in FIG. 2 with a portion of the stator core shown in FIG. 1.
Figure 4B:
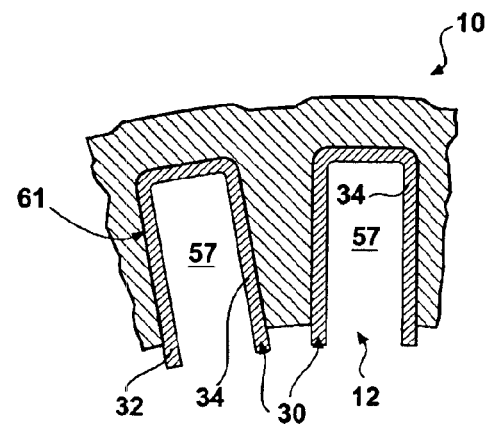
Figure 4C:
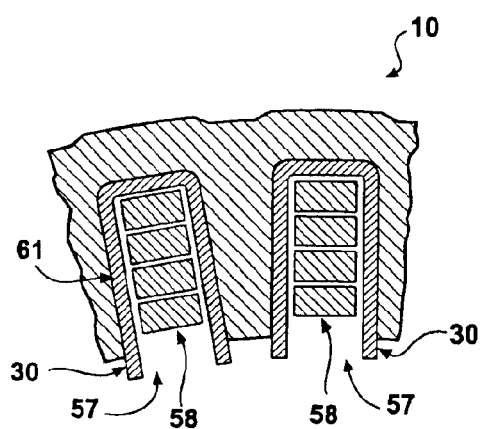
Figure 4D:
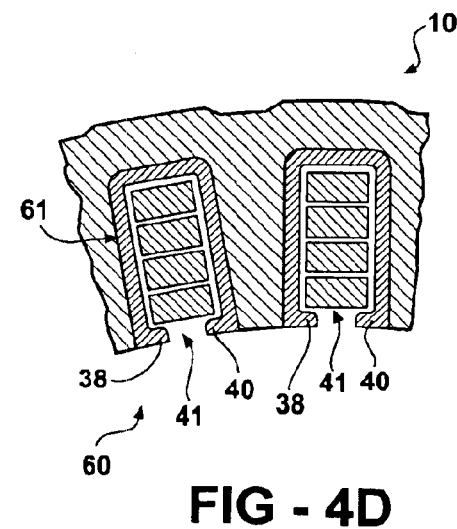

Referring now to FIGS. 4a through 4d, a method for assembling a stator assembly, discussed in more detail below, is shown. A portion of the stator core 10 with a plurality of core slots 12 defining a plurality of teeth 19 therebetween is shown in FIG. 4a. A corresponding plurality of insert members 30 is inserted in a respective core slot 12 in FIG. 4b. Preferably, the extension members 32 and 34 of the insert member 30 are attached to the core slot 12 by an interference fit. However, the extension members 32 and 34 could also be retained in the core slots 12 using an adhesive or welding at a portion 61 between respective outer surfaces of the extension members 32 and 34 and the core slots 12. Alternatively, the extension members 32 and 34 could also be retained in the core slots 10 by metal staking (not shown), interlocking features in the extension members 32 and 34 and the stator core 10 (not shown), or other mechanical means. The first extension member 32 and second extension member 34 of the insert members 30, when installed in the core slots 12, define an aperture 57 therebetween. A stator winding having a plurality of conductors 58 is inserted in the respective apertures 57 in FIG. 4c. The conductors 58 of the stator winding are generally rectangular in cross-sectional shape, aligned in one radial row in each slot and fit closely to the width of the apertures 57. After a predetermined number of layers (such as four as shown in FIGS. 4c and 4d) of the conductors 58 have been inserted, the free ends 38 and 40 of each of the insert members 30 are bent in FIG. 4d to the installed position of FIG. 2b, forming the gaps 41 therebetween and enclosing the conductors 58 in the apertures 57. Alternatively, other conductor shapes could be used, as for example, conductors with a round cross-sectional shape. Because the free ends 38 and 40 are not attached to the adjacent teeth 19, the free ends 38 and 40 avoid the tendency to tear when folded and are easier to form to the inner diameter of the stator core 10 as shown in FIGS. 2b and 4d. The stator core 10, the insert members 30, and the stator winding conductors 58, when assembled, form a stator assembly, indicated generally at 60. After the stator assembly 60 is assembled completely, the stator winding conductors 58 are varnished in place (not shown) to insulate the various phases of the stator winding conductors 58 from each other. Alternatively, the stator windings could be held in place using by the bent over free ends 38 and 40 of the insert members 30, advantageously eliminating the need for varnish.

Figure 5:
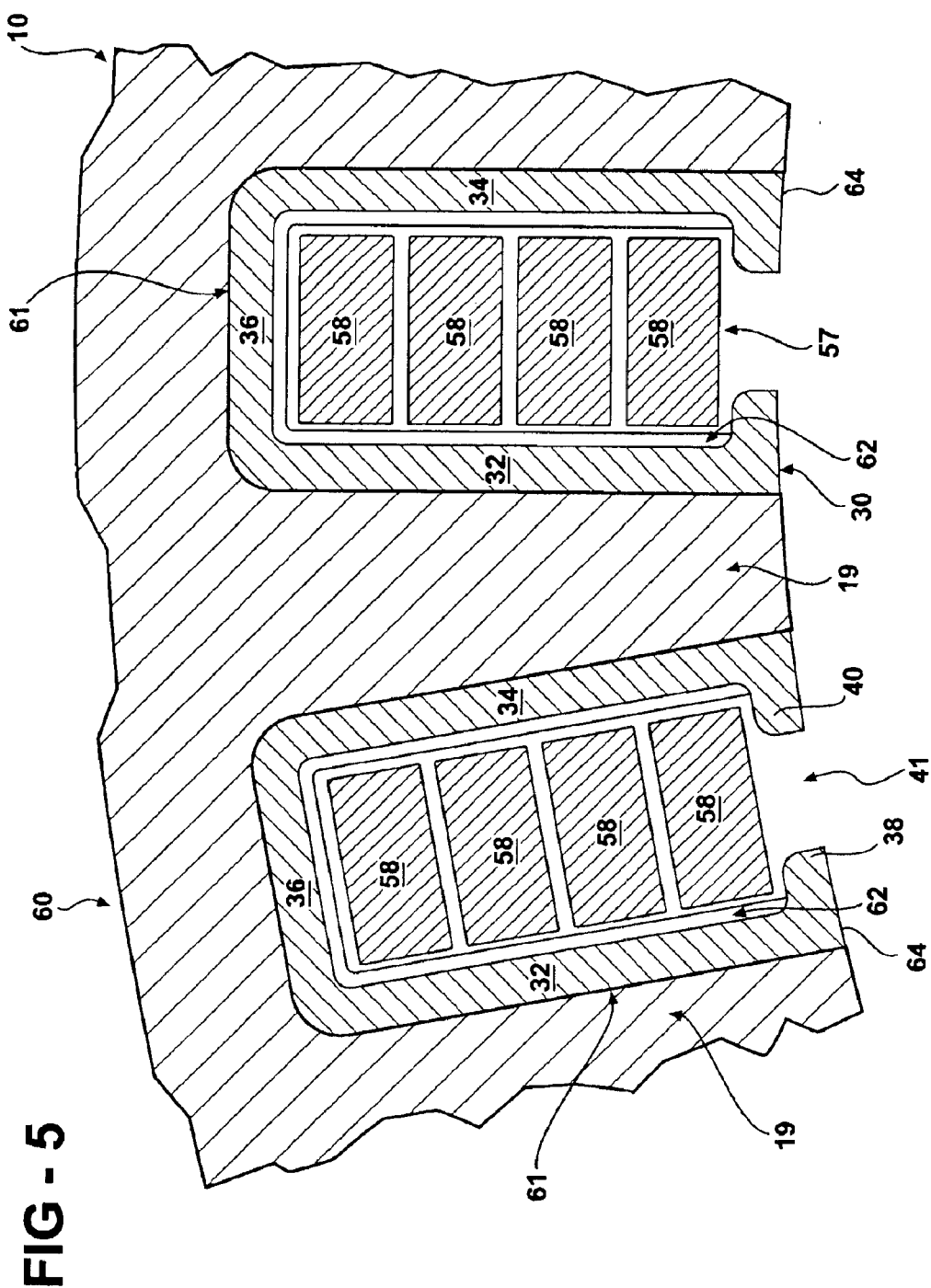
FIG. 5 is a fragmentary plan view of an assembled insert member showing an insulating member detail.

Referring now to FIG. 5, a portion of the stator assembly 60 is shown in an enlarged scale. An insulating member 62 is attached to an interior surface of the extension portions, 32 and 34 and the base portion 36 of the insert member 30. The insulating member 62 is preferably constructed of an electrically insulating material including, but not limited to, a paper/polyester laminate or similar type material having electrically insulating properties. The insulating member 62 is operable to insulate the conductors 58 from the insert members 30 and the stator core 10 during operation of the alternator. Preferably, the insulating member 62 is applied to each of the insert members 30 prior to the insert members 30 being inserted into the core slots 12. Alternatively, the insulating member 62 is applied to each of the insert members 30 after the insert members 30 have been inserted into the core slots 12. The insulating member 62 provides additional insulation along with the varnish that is applied to the stator conductors 58 after the stator assembly 60 is assembled completely. Alternatively, the insulating member 62 could consist of an electrostatically applied coating or another type of coating process such as painting.

An outer edge 64 of the insert members 30, after the free ends 38 and 40 have been bent to the installed position, is at a substantially equal distance from the base member 36 as an outer edge of the teeth 19 of the stator core 10 so that the insert members 30 do not exceed the radial depth 25 of the core slots 12. The combination of the area of the outer edges of the teeth 19 and the area outer edges 64 of the insert members 30 results in more steel area, which helps the teeth 19 conduct magnetic flux between the core yoke 21 and the rotor poles (not shown) by providing additional magnetic material in the magnetic flux path for each core slot 12. Alternatively, because the insert members 30 are formed from a sheet of magnetic material with essentially zero scrap, the members 30 can be formed of a lower loss yet more expensive magnetic material. The lower loss magnetic material is preferably a material that is more resistant to eddy current losses and/or hysteresis losses in the material.

Furthermore, alternatively, because the path of magnetic flux through an insert member 30 flows in the free end 38, down the leg member 32, along the base member 36 and up the other leg member 34 and finally out the other free end 40, and therefore, always flows in one direction with respect to the raw material of the formed insert member 30, the insert member 30 can be made of a grain oriented magnetic material, for even lower losses. The reduced gaps 41 on the inner diameter of the stator core 10 decrease the effective air gap area, which in turn increases the alternator output. The free ends 38 and 40 of the insert member 30 do not touch because this would cause a portion of the magnetic flux (not shown) to flow through the nonexistent gap and therefore not flow through the teeth 19 and the core yoke 21; the flux disadvantageously would not circle around the conductors 58 and, therefore, would not induce a voltage or current in the conductors 58 during operation of the alternator. A smaller air gap also reduces the fluctuation of magnetic flux on the rotor pole surface which reduces eddy current losses and, therefore, increases the efficiency of the alternator.

In accordance with the provisions of the patent statutes, the present invention has been described in what is considered to represent its preferred embodiment. However, it should be noted that the invention can be practiced otherwise than as specifically illustrated and described without departing from its spirit or scope. In addition, while the present invention has been described generally in the context of alternators, those skilled in the art will appreciate that the insert members 30 and 42 may be advantageously utilized and beneficial for the operation of many types of dynamo-electric machines including, but not limited to, alternators, motors, and integrated starter-motors.

What is claimed is:

1. A stator assembly for an dynamoelectric machine, comprising:
    a generally cylindrically-shaped stator core having a plurality of circumferentially spaced axially-extending core slots in a surface thereof and each having a respective radial depth and a substantially constant circumferential width and a plurality of tooth members therebetween, said core slots extending between a first and a second end of said stator core;
    a plurality of insert members each fixedly received by a respective one of said core slots for lining each respective core slot and having a pair of leg members extending from a base member and forming an aperture therebetween, said insert members being formed from a magnetically permeable material; and
    a stator winding having substantially straight wire segments received by said insert members, said substantially straight segments of said stator winding and said insert members being electrically insulated from one another,
    wherein said at least one of said extending leg members is bent over a portion of said substantially straight wire segments in said core slots, narrowing said aperture between said extending leg members, an outer edge of each of said extending leg members extending to but not exceeding said radial depth of said core slots, and
    wherein said tooth members are undeformed after said extending leg members are bent over.

2. The stator assembly according to claim 1 wherein said insert members are generally U-shaped.

3. The stator assembly according to claim 1 wherein each of said extending leg members is bent over a portion of said straight wire segments in said core slots to narrow said aperture between said extending leg members.

4. The stator assembly according to claim 1 wherein said aperture between said extending leg members is narrowed to a width smaller than the width of said straight wire segments.

5. The stator assembly according to claim 1 wherein said straight segments of said stator winding and said insert members are electrically insulated from one another by an insulating member on an inner surface of said insert member.

6. The stator assembly according to claim 5 wherein said insulating member is formed from a paper and polyester laminate.

7. The stator assembly according to claim 1 wherein said stator core and said insert member are each formed of a magnetically permeable material.

8. The stator assembly according to claim 7 wherein said insert member is formed from a lower loss grade of magnetically permeable material than said magnetically permeable material of said stator core.

9. The stator assembly according to claim 8 wherein said lower loss grade of magnetically permeable material is a grain oriented magnetic material.

10. The stator assembly according to claim 1 wherein said substantially straight segments of said stator winding have a substantially rectangular cross section.

11. The stator assembly according to claim 1 wherein said leg members of said insert members are press fit to the sides of said core slots.

12. The stator assembly according to claim 1 wherein said insert members are retained in said core slots by welding together respective exterior surfaces of said insert members and said core slots.

13. The stator assembly according to claim 1 wherein said insert members are retained in said core slots by adhesively bonding together respective exterior surfaces of said insert members and said core slots.

14. The stator assembly according to claim 1 wherein said stator windings are inserted in said core slots from a radially inward position.

\* \* \* \* \*